(12) United States Patent
Christman et al.

(10) Patent No.: US 10,732,908 B2
(45) Date of Patent: Aug. 4, 2020

(54) ACCELERATED LABEL PRINTING

(71) Applicant: Sealed Air Corporation (US), Charlotte, NC (US)

(72) Inventors: Russell Christman, Dunstable, MA (US); John Mario, Auburn, MA (US); Michael Kalinowski, Nashua, NH (US)

(73) Assignee: Sealed Air Corporation (US), Charlotte, NC (US)

( * ) Notice: Subject to any disclaimer, the term of this patent is extended or adjusted under 35 U.S.C. 154(b) by 0 days.

(21) Appl. No.: 16/336,231

(22) PCT Filed: Sep. 21, 2017

(86) PCT No.: PCT/US2017/052666
§ 371 (c)(1),
(2) Date: Mar. 25, 2019

(87) PCT Pub. No.: WO2018/057706
PCT Pub. Date: Mar. 29, 2018

(65) Prior Publication Data
US 2019/0212956 A1    Jul. 11, 2019

Related U.S. Application Data

(60) Provisional application No. 62/399,524, filed on Sep. 26, 2016.

(51) Int. Cl.
*H04N 1/00* (2006.01)
*G06F 3/12* (2006.01)
(Continued)

(52) U.S. Cl.
CPC ............. *G06F 3/1214* (2013.01); *B65C 1/00* (2013.01); *B65C 9/40* (2013.01); *B65C 9/46* (2013.01);
(Continued)

(58) Field of Classification Search
CPC ... G06F 3/1289; G06F 16/22; G06K 7/10297; G06K 7/1413; G06Q 10/0838; G06Q 10/087
(Continued)

(56) References Cited

U.S. PATENT DOCUMENTS

2003/0155422 A1* 8/2003 Kawakami ............. G06Q 10/08
235/462.46
2004/0015493 A1  1/2004 Garner et al.
(Continued)

*Primary Examiner* — Saeid Ebrahimi Dehkordy
(74) *Attorney, Agent, or Firm* — Jon M. Isaacson

(57) ABSTRACT

A system of facilitating printing of shipping labels includes a computing device and a label printer. The computing device receive shipment database data from a remote computing device, store the shipment database data in a shipment database, receive scan data associated with an object from a scanning device, determine whether shipment data for the object is in the shipping database, determine shipping information for the object based on whether shipment data for the object is in the shipping database, and send shipping information to the label printer. The shipping information for the object is based on whether shipment data for the object is in the shipping database. The label printer prints a shipping label for the object based on the shipping information.

26 Claims, 10 Drawing Sheets

(51) Int. Cl.

| | | |
|---|---|---|
| *B65C 9/46* | (2006.01) | |
| *G06Q 10/08* | (2012.01) | |
| *B65C 1/00* | (2006.01) | |
| *G06F 16/22* | (2019.01) | |
| *B65C 9/40* | (2006.01) | |
| *B65C 9/00* | (2006.01) | |
| *G06K 7/10* | (2006.01) | |
| *G06K 7/14* | (2006.01) | |

(52) U.S. Cl.
CPC .......... *G06F 3/1243* (2013.01); *G06F 3/1289* (2013.01); *G06F 16/22* (2019.01); *G06Q 10/087* (2013.01); *G06Q 10/0838* (2013.01); *B65C 2009/0003* (2013.01); *B65C 2009/408* (2013.01); *G06K 7/10297* (2013.01); *G06K 7/1413* (2013.01)

(58) Field of Classification Search
USPC ....................................................... 358/1.16
See application file for complete search history.

(56) References Cited

U.S. PATENT DOCUMENTS

| | | |
|---|---|---|
| 2005/0137991 A1 | 6/2005 | Bruce et al. |
| 2010/0131536 A1 | 5/2010 | Funcke |
| 2014/0360141 A1 | 12/2014 | Willard et al. |

\* cited by examiner

ACCELERATED LABEL PRINTING

BACKGROUND

The present disclosure is in the technical field of label printing. More particularly, the present disclosure is directed to decreasing the time to print shipping labels in a shipping facility.

In some shipping facilities, objects are packaged and shipped to different recipients. For example, in the e-commerce sector, goods ordered online are packaged and shipped to individual consumers. These packages must include the proper object or objects, be properly labeled for shipping, and shipped to the proper consumer. As demand increased for fast delivery of goods, such as those ordered by consumers online, shipping facilities are attempting to increase the throughput of packaging and shipping of objects. Many efforts have been attempted to increase the throughput of packaging facilities, including improved organization of inventories in shipping facilities, increased automation of inventory delivery to packers on packaging lines, increased automation of package preparation and filling, reduced timing between receiving an order and initiating the packaging process, and the like. Further efforts continue to be made to increase the throughput of packaging facilities.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method of facilitating printing of shipping labels uses a system that includes a computing device and a label printer. The method includes the computing device receiving shipment database data from a remote computing device via one or more networks, where the remote computing device is located remotely from the computing device. The method further includes the computing device storing the shipment database data in a shipment database, receiving scan data from a scanning device where the scan data is associated with an object, determining whether shipment data for the object is in the shipping database, and determining shipping information for the object based on whether shipment data for the object is in the shipping database. The method further includes the computing device sending shipping information to the label printer, where the shipping information for the object is based on whether shipment data for the object is in the shipping database, and the label printer printing a shipping label for the object based on the shipping information in response to the label printer receiving the shipping information from the computing device.

In one example, determining whether shipment data for the object is in the shipping database includes the computing device determining that complete shipment data for the object is in the shipping database, where the shipping information for the object includes the complete shipment data. In another example, determining whether shipment data for the object is in the shipping database includes the computing device determining that the shipping database contains either incomplete shipment data for the object or no shipment data for the object, where the shipping information for the object includes common exception shipping data. In another example, receiving the shipment database data and storing the shipment database data in the shipment database occur before receiving the scan data from the scanning device.

In another example, the scan data includes one or more of a unique identifier of the object, a stock keeping unit (SKU) number of the object, a model number of the object, a serial number of the object, or an image of the object. In another example, the method further includes the computing device identifying the object based on the scan data received from the scanning device before determining whether shipment data for the object is in the shipping database. In another example, the scanning device includes one or more of a barcode scanner, a radio frequency identification (RFID) scanner, or a camera.

In another example, the system includes one or more memories, and wherein the shipment database is located in the one or more memories. In another example, the system further comprises the scanning device. In another example, the system is located in a shipping facility and wherein the label printer is located downstream of the scanning device along a shipping line in the shipping facility. In another example, the method further includes the computing device generating periodic reports indicative of objects packaged or shipped from the shipping facility on behalf of a seller and sending the periodic reports to a remote computing device associated with the seller.

In another embodiment, a non-transitory computer readable medium has instructions stored thereon for facilitating printing of shipping labels, where the instructions, in response to execution by a processing element in a computing device, cause the computing device to perform a number of function. The functions include receiving shipment database data from a remote computing device via one or more networks, where the remote computing device is located remotely from the computing device, storing the shipment database data in a shipment database, receiving scan data from a scanning device, wherein the scan data is associated with an object, determining whether shipment data for the object is in the shipping database, determining shipping information for the object based on whether shipment data for the object is in the shipping database, and creating a shipping label based on the shipping information.

In one example, the instructions, in response to execution by the processing element, further cause the computing device to send the created shipping label to a label printer, where the label printer is configured to print the shipping label for the object based on the created shipping label in response to the label printer receiving the created shipping label from the computing device. In another example, the instructions that cause the computing device to determine whether shipment data for the object is in the shipping database comprise instructions that cause the computing device to determine that complete shipment data for the object is in the shipping database, where the shipping information for the object includes the complete shipment data. In another example, the instructions that cause the computing device to determine whether shipment data for the object is in the shipping database comprise instructions that cause the computing device to determine that the shipping database contains either incomplete shipment data for the object or no shipment data for the object, where the shipping information for the object includes common exception shipping data.

In another example, the instructions, in response to execution by the processing element, cause the computing device to receive the shipment database data and store the shipment database data in the shipment database occur before receiving the scan data from the scanning device. In another example, the instructions, in response to execution by the processing element, further cause the computing device to identify the object based on the scan data received from the scanning device before determining whether shipment data for the object is in the shipping database.

In another embodiment, a system of facilitating printing of shipping labels includes a computing device and a label printer communicatively coupled to the computing device. The computing device is configured to receive shipment database data from a remote computing device via one or more networks, where the remote computing device is located remotely from the computing device, to store the shipment database data in a shipment database, to receive scan data from a scanning device, where the scan data is associated with an object, to determine whether shipment data for the object is in the shipping database, to determine shipping information for the object based on whether shipment data for the object is in the shipping database, and to send shipping information to the label printer, wherein the shipping information for the object is based on whether shipment data for the object is in the shipping database. The label printer is configured to print a shipping label for the object based on the shipping information in response to the label printer receiving the shipping information from the computer.

In one example, the computing device is configured to determine whether shipment data for the object is in the shipping database by determining that complete shipment data for the object is in the shipping database, where the shipping information for the object includes the complete shipment data. In another example, the computing device is configured to determine whether shipment data for the object is in the shipping database by determining that the shipping database contains either incomplete shipment data for the object or no shipment data for the object, where the shipping information for the object includes common exception shipping data.

In another example, the computing device is configured to receive the shipment database data and store the shipment database data in the shipment database before receiving the scan data from the scanning device. In another example, the computing device is further configured to identify the object based on the scan data received from the scanning device before determining whether shipment data for the object is in the shipping database. In another example, the system further comprises the scanning device. In another example, the system is located in a shipping facility and wherein the label printer is located downstream of the scanning device along a shipping line in the shipping facility. In another example, the shipping facility includes one or more sensors configured to determine a characteristic of an object. In another example, the computing device is configured to receive sensor data about one or more objects from the one or more sensors and to perform one or more of storing the sensor data in a memory located in the shipping facility, sending the sensor data to a remote computing device associated with a seller of the one or more objects, or sending the sensor data to a remote computing device associated with a logistical partner.

In another embodiment, a method of obtaining a shipping label for an order includes a computing device receiving a notification of an order, obtaining shipment data for the order, sending the shipment data to a first remote computing device, where the first remote computing device is configured to generate a shipping label for the order and to send the shipping label to the computing device, receiving the shipping label from the first remote computing device, and storing the shipping label received from the first remote computing device.

In one example, the method further includes the computing device receiving scan data indicating an object, wherein the object is associated with the order and sending the shipping label to a label printer in response to the computing device receiving the scan data. In another example, the method further includes the computing device determining that the object is associated with the order before the computing device sends the shipping label to the label printer. In another example, the method further includes the computing device determining whether a shipment database includes the shipment data for the order before the computing device obtains the shipment data, where the shipment database is located on one of the computing device or another computing device that is communicatively coupled to the computing device via a local network. In another example, the computing device determines that the shipment database does not include the shipment database and the method further includes the computing device sending a request for the shipment data from a second remote computing device and receiving the shipment data from the second remote computing device. In another example, the computing device determines that the shipment database includes the shipment database and the method further includes the computing device retrieving the shipment data from the shipment database.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
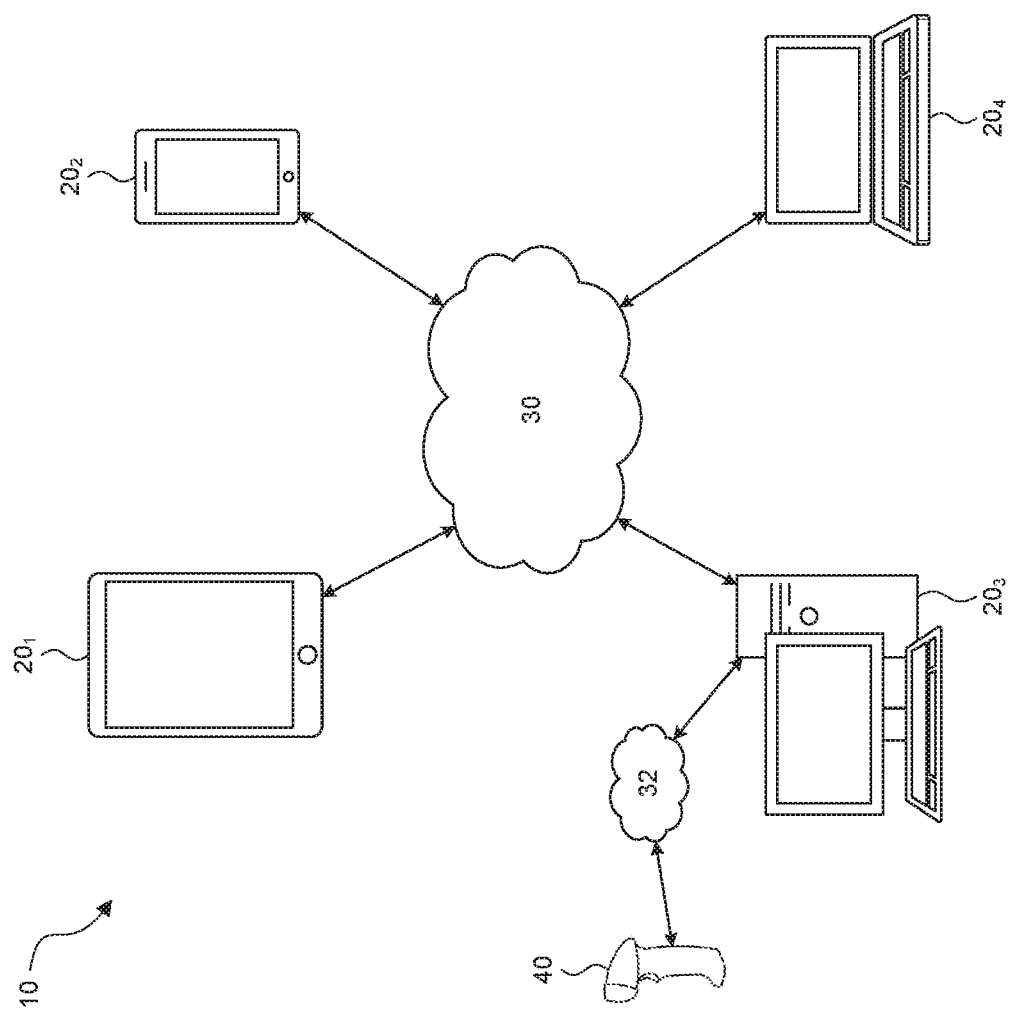
FIG. 1 depicts an example embodiment of a system that may be used to implement some or all of the embodiments described herein.

The present disclosure describes embodiments that increase shipping line throughput by decreasing the time to print shipping labels in a shipping facility. In many cases, a computing device used to sell goods online is located remotely from the shipping facility that fills and ships the order. In some examples, the shipping facility is operated by the seller, but the computing devices (e.g., servers) which complete the orders are located remotely from the shipping facility. In other examples, the seller contracts a third party shipping facility to fill and ship orders, and the seller's computing devices which complete the orders are located remotely from the third-party shipping facility. In existing systems where the seller's computing devices are located remotely from the shipping facility, when the shipping facility identifies an object to be shipped, the shipping facility communicates with the seller's computing devices to obtain the shipping information for creating shipping labels. However, the time it takes to contact the seller's computing devices to obtain the shipping information and to receive the shipping information back from the seller can create delay in the shipping process. Even a small delay in obtaining the shipping information for each shipment can reduce the overall throughput of the shipping facility over time.

Described herein are embodiments of methods, systems, and computer-readable media for facilitating printing of shipping labels. In one example, the system includes a computing device and a label printer. The computing device receives shipment database data from a remote computing device (e.g., a seller's computing device) via one or more networks. The remote computing device is located remotely from the computing device. The computing device stores the shipment database data in a shipment database. This shipment database is a dynamic database that allows the shipping data to be provided to the shipping facility before the shipping facility packages objects to be shipped, such as by sending the shipping data soon after an order is received. As the remote computing device continues to receive orders, the remote computing device can continue to send shipping data to the computing device for storage in the shipping database.

From time to time, the computing device receives scan data associated with an object from a scanning device, such as a barcode scanner, a radio frequency identification (RFID) tag scanner, and the like. The scan data may include an identifier of the object (e.g., a unique identifier). The computing device determines whether shipment data for the object is in the shipping database and then determines shipping information for the object based on whether shipment data for the object is in the shipping database. The computing device sends the shipping information to the label printer. The label printer prints a shipping label for the object based on the shipping information.

Because the remote computing device has already provided shipping data for the shipping database stored in the shipping facility, the label printer is able to print a shipping label without waiting for a communication to be sent to and received from the remote computing device. These embodiments increase shipping line throughput by decreasing the time to print shipping labels in a shipping facility. Various embodiments for accomplishing these effects are described in detail herein.

FIG. 1 depicts an example embodiment of a system 10 that may be used to implement some or all of the embodiments described herein. In the depicted embodiment, the system 10 includes computing devices $20_1$, $20_2$, $20_3$, and $20_4$ (collectively computing devices 20). In the depicted embodiment, the computing device $20_1$ is a tablet, the computing device $20_2$ is a mobile phone, the computing device $20_3$ is a desktop computer, and the computing device $20_4$ is a laptop computer. In other embodiments, the computing devices 20 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 20 are communicatively coupled to each other via one or more networks 30 and 32. Each of the networks 30 and 32 may include one or more wired or wireless networks (e.g., a 3G network, the Internet, an internal network, a proprietary network, a secured network). The computing devices 20 are capable of communicating with each other and/or any other computing devices via one or more wired or wireless networks. While the particular system 10 in FIG. 1 depicts that the computing devices 20 communicatively coupled via the network 30 include four computing devices, any number of computing devices may be communicatively coupled via the network 30.

In the depicted embodiment, the computing device $20_3$ is communicatively coupled with a peripheral device 40 via the network 32. In the depicted embodiment, the peripheral device 40 is a scanner, such as a barcode scanner, an optical scanner, a computer vision device, and the like. In some embodiments, the network 32 is a wired network (e.g., a direct wired connection between the peripheral device 40 and the computing device $20_3$), a wireless network (e.g., a Bluetooth connection or a WiFi connection), or a combination of wired and wireless networks (e.g., a Bluetooth connection between the peripheral device 40 and a cradle of the peripheral device 40 and a wired connection between the peripheral device 40 and the computing device $20_3$). In some embodiments, the peripheral device 40 is itself a computing device (sometimes called a "smart" device). In other embodiments, the peripheral device 40 is not a computing device (sometimes called a "dumb" device).

Figure 2:
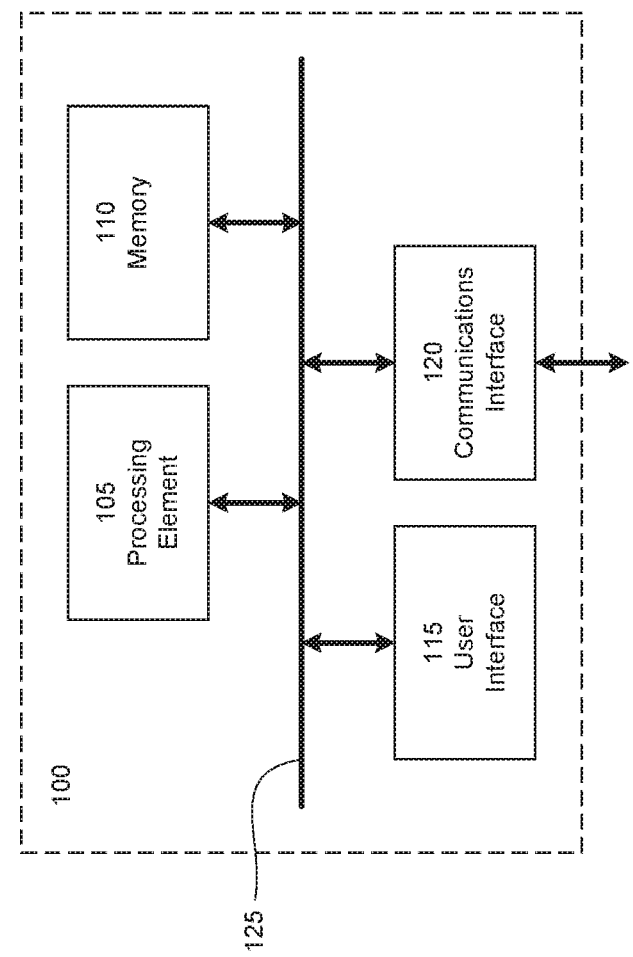
FIG. 2 depicts a block diagram of an embodiment of a computing device, in accordance with the embodiments described herein.

Depicted in FIG. 2 is a block diagram of an embodiment of a computing device 100. Any of the computing devices 20 and/or any other computing device described herein may include some or all of the components and features of the computing device 100. In some embodiments, the computing device 100 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 100 includes a processing element 105, memory 110, a user interface 115, and a communications interface 120. The processing element 105, memory 110, a user interface 115, and a communications interface 120 are capable of communicating via a communication bus 125 by reading data from and/or writing data to the communication bus 125. The computing device 100 may include other components that are capable of communicating via the communication bus 125. In other embodiments, the computing device does not include the communication bus 125 and the components of the computing device 100 are capable of communicating with each other in some other way.

The processing element 105 (also referred to as one or more processors, processing circuitry, and/or similar terms used herein) is capable of performing operations on some external data source. For example, the processing element may perform operations on data in the memory 110, data receives via the user interface 115, and/or data received via the communications interface 120. As will be understood, the processing element 105 may be embodied in a number of different ways. In some embodiments, the processing element 105 includes one or more complex programmable logic devices (CPLDs), microprocessors, multi-core processors, co-processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 105 is configured for a particular use or configured to execute instructions stored in volatile or nonvolatile media or otherwise accessible to the processing element 105. As such, whether configured by hardware or computer program products, or by a combination thereof, the processing element 105 may be capable of performing steps or operations when configured accordingly.

The memory 110 in the computing device 100 is configured to store data, computer-executable instructions, and/or any other information. In some embodiments, the memory 110 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD-ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random-access memory (NVRAM), magneto-resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 110 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity-relationship model, object model, document model, semantic model, graph model, or any other model.

The user interface 115 of the computing device 100 is in communication with one or more input or output devices that are capable of receiving inputs into and/or outputting any outputs from the computing device 100. Embodiments of input devices include a keyboard, a mouse, a touchscreen display, a touch sensitive pad, a motion input device, movement input device, an audio input, a pointing device input, a joystick input, a keypad input, peripheral device 40, foot switch, and the like. Embodiments of output devices include an audio output device, a video output, a display device, a motion output device, a movement output device, a printing device, and the like. In some embodiments, the user interface 115 includes hardware that is configured to communicate with one or more input devices and/or output devices via wired and/or wireless connections.

The communications interface 120 is capable of communicating with various computing devices and/or networks. In some embodiments, the communications interface 120 is capable of communicating data, content, and/or any other information, that can be transmitted, received, operated on, processed, displayed, stored, and the like. Communication via the communications interface 120 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface 120 may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the control computing device 100 may be located remotely from other components of the computing device 100 components, such as in a distributed system. Furthermore, one or more of the components may be combined and additional components performing functions described herein may be included in the computing device 100. Thus, the computing device 100 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer-readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer-readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Figure 3:
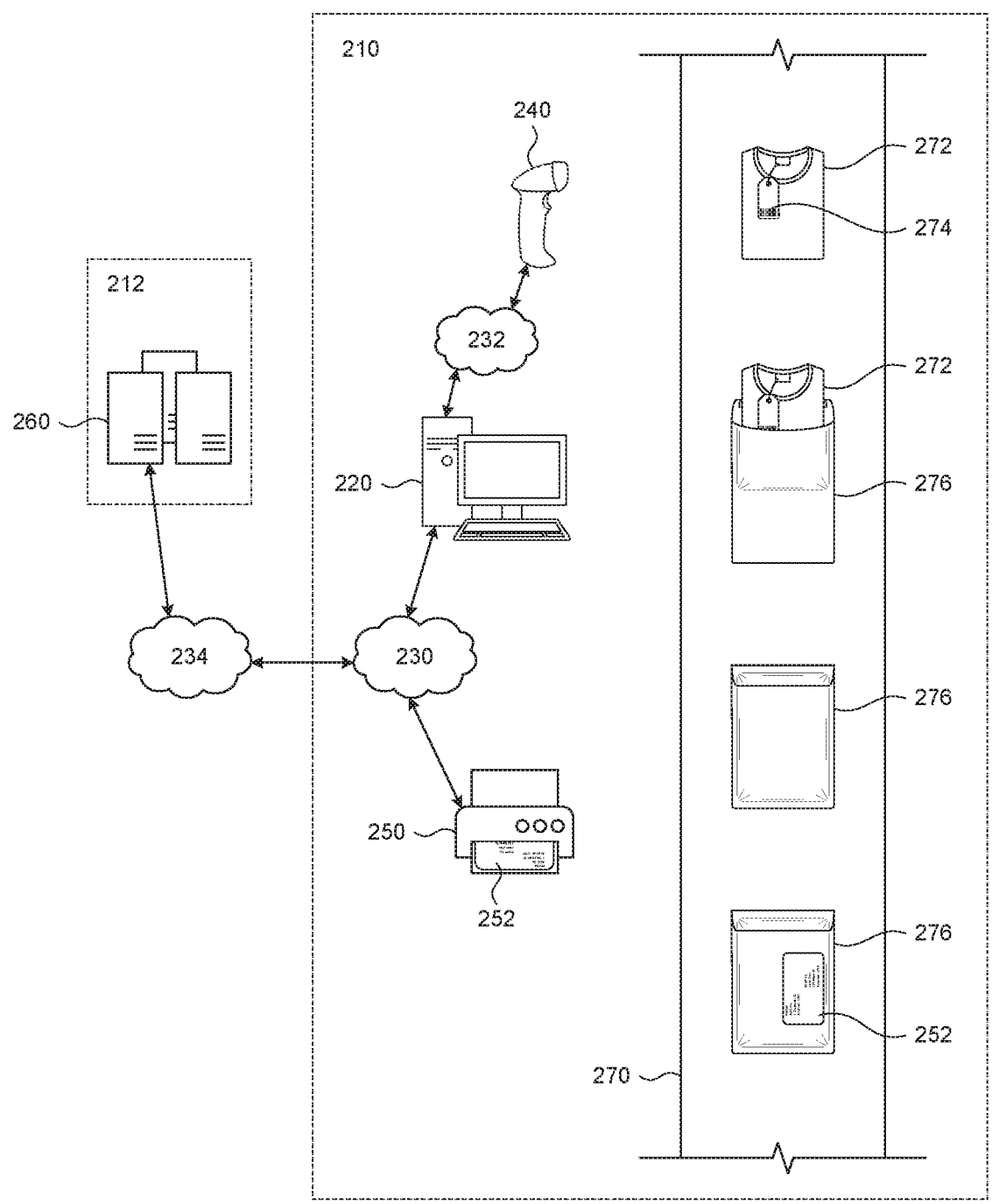
FIG. 3 depicts an embodiment of a system in a shipping facility that is communicatively coupled to a remote facility, in accordance with the embodiments described herein.

Depicted in FIG. 3 is an embodiment of a system in a shipping facility 210 that is communicatively coupled to a remote facility 212. In some embodiments, the shipping facility 210 is a single physical building (e.g., a warehouse), a number of buildings (e.g., a company's campus of buildings), or a portion of a physical building (e.g. a shared office space). In some embodiments, the shipping facility 210 is operated by a single entity (e.g., a shipping company). In some embodiments, the remote facility 212 is operated by a different entity than the entity that operates that shipping facility 210. In one example, the remote facility 212 is operated by an online seller of goods. In some embodiments, the remote facility 212 is operated by the same entity that operates that shipping facility 210. In one example, the remote facility 212 is a data center or other facility that houses computing devices separate from the shipping facility 210.

The system in the shipping facility 210 includes a computing device 220 and a label printer 250. In the depicted embodiment, the computing device 220 is a desktop computer. In other embodiments, the computing device 220 may be any other type of computing device, such as a server, a blade, or any other computing device. The computing device 220 depicted in FIG. 3 is a single computing device, but the computing device 220 can also include any number of computing devices communicatively coupled to each other. In the depicted embodiment, the label printer 250 is configured to print a shipping label 252 on a paper medium, such as a self-adhesive sticker that is configured to be adhered to a shipping container. In other embodiments, the label printer 250 is configured to print a shipping label on any other medium that can be adhered to a shipping container or to print a shipping label directly onto the shipping container. The computing device 220 and the label printer 250 are communicatively coupled via a network 230. The network 230 may be a wired network, a wireless network, or a combination of any number of wired and/or wireless networks. In some embodiments, the network 230 is a local area network (LAN) intended to be accessed only by computing devices within the shipping facility 210 or by authenticated computing devices outside of the shipping facility 210.

The computing device 220 is also communicatively coupled to a scanning device 240 via a network 232. The scanning device 240 is configured to generate scan data associated with objects and to provide the scan data to the computing device 220 via the network 232. In some examples, the scanning device 240 includes a barcode scanner configured to scan barcodes on objects, an RFID scanner configured to scan FRID tags on objects, a camera configured to obtain images of objects, or any combination thereof. In some embodiments, the scan data generated by the scanning device 240 includes the data gathered by the scanning device 240. In one example, the scanning device 240 includes a camera and the scan data includes an image gathered by the camera and the computing device 220 is configured to identify an object by processing the image. In some embodiments, the scan data generated by the scanning device 240 includes data generated from the data gathered by the scanning device 240. In one example, the scanning device 240 includes a barcode scanner that scans barcodes and generates an ASCII string indicative of the data encoded by the widths and order of the bars in the barcode. In another examples, the scanning device 240 includes a camera that takes an image of an object, processes the image (e.g., using a processing element in the scanning device 240) to generate an object identifier, and sends the object identifier to the computing device 220. In various embodiments, the scan data includes one or more of a unique identifier of an object, a stock keeping unit (SKU) number of an object, a model number of an object, a serial number of an object, an image of an object, or any other object identifier.

The remote facility 212 includes a remote computing device 260, such as one or more servers, one or more server blades, and the like. In some embodiments, the remote computing device 260 generates shipment database data, such as data for shipping orders that are completed by the remote computing device 260. The computing device 220 and the label printer 250 are communicatively coupled to the remote computing device 260 via the network 230 and a network 234. In one embodiment, the network 234 includes one or more non-private communication networks, such as the Internet. In some embodiments, the network 230 includes one or more systems (e.g., edge routers) configured to perform one or more of encryption of data being sent out of the network 230 across the network 234, decryption of data being received from the network 234 into the network 230, provision of quality of service (QoS) for data packets received from the network 234, virtual addressing of data packets received from the network 234, firewalling of the network 230 from security threats made via network 234, and the like. The arrangement of the networks 230 and 234 permit the communication of data between the remote computing device 260 and any of the computing devices (e.g., the computing device 220 and the label printer 250) or peripheral devices (e.g., the scanning device 240) in the shipping facility 210.

While the arrangement of networks and devices in FIG. 3 provides an architecture that allows for communication between the devices, those skilled in the art will recognize that other arrangements of networks and devices may be devised to accomplish the embodiments of methods described herein. Those skilled in the art will recognize that any other architecture that permits the appropriate communication between devices is within the scope of the present disclosure.

Also depicted in FIG. 3 is an example of a shipping line 270 and positions of packaging an object 272 along the shipping line 270. At the first position, near the top of the shipping line 270, the object 272 is positioned on the shipping line 270. The object 272 includes a scanning tag 274 that is configured to be scanned by a scanning device 240. In the depicted embodiment, the scanning tag 274 is a tag that is coupled to the object 272. In other embodiments, the scanning tag 274 may be printed on a package around the object 272, printed on the object 272 itself, attached to the object 272, or located on any other medium coupled to or associated with the object 272. In the depicted embodiment, the scanning tag 274 is a tag with a barcode that can be read by the scanning device 240 (e.g., a barcode scanner). In other embodiments, the scanning tag 274 is an RFID tag that can be read by the scanning device 240 (e.g., an RFID scanner) or any other type of tag that can be scanned. In other embodiments, the object 272 does not include the scanning tag 274 and the scanning device 240 is configured to gather data about the object 272 (e.g., an image) that can be used to identify the object 272.

At the second position down from the top of the shipping line 270, the object 272 is inserted into a shipping container 276. In the depicted embodiment, the shipping container 276 is a flexible pouch. In other embodiments, the shipping container 276 may be a cardboard box, an envelope, a plastic enclosure, or any other type of shipping container. At the third position down from the top of the shipping line 270, the object 272 is fully inserted in the shipping container 276 and the shipping container 276 is closed. In the depicted embodiment, the shipping container 276 is closed using a self-adhesive strip located on the flap of the flexible pouch. In other embodiments, the shipping container 276 may be closed by taping an opening of the shipping container 276, heat sealing an opening of the shipping container 276, stapling an opening of the shipping container 276, or by any other method of closing the shipping container 276. In some embodiments, the inserting of the object 272 into the shipping container 276 and the closing of the shipping container 276 is performed automatically by an automated system.

At the bottom position of the shipping line 270, the shipping label 252 is applied to the exterior of the shipping container 276. In the depicted embodiment, the shipping label 252 is printed onto a self-adhesive sticker and the shipping label is adhered to the exterior of the shipping container 276. The shipping label 252 includes information to facilitate the shipping of the shipping container 276, such as one or more of a recipient name, a destination address, a shipper name, a return address, a printed indication of postage paid, a shipping tracking number, or any other shipping information. In order for the object 272 to be shipped to the proper destination, the shipping information on the shipping label 252 must be the proper shipping information for the particular object 272. In the depicted embodiment, the label printer 250 is located downstream of the scanning device 240 along the shipping line 270 in the shipping facility 210.

As can be seen in the depicted in FIG. 3, after the scanning device 240 scans the object 272 and/or the scanning tag 274, the processes of packaging the object 272 in the shipping container 276 and of printing the shipping label 252 may occur in parallel. In this way, the shipping label 252 can be prepared without waiting for the object 272 to be fully packaged in the shipping container 276.

Described below are embodiments of how the label printing process has been performed prior to the present disclosure and embodiments introduced by way of the present disclosure. Some of these embodiments are described with respect to the computing device 220, the scanning device 240, the label printer 250, and the remote computing device 260 depicted in FIG. 3. Those skilled in the art will recognize that these embodiments may be accomplished using other types of systems and network architecture.

Figure 4:
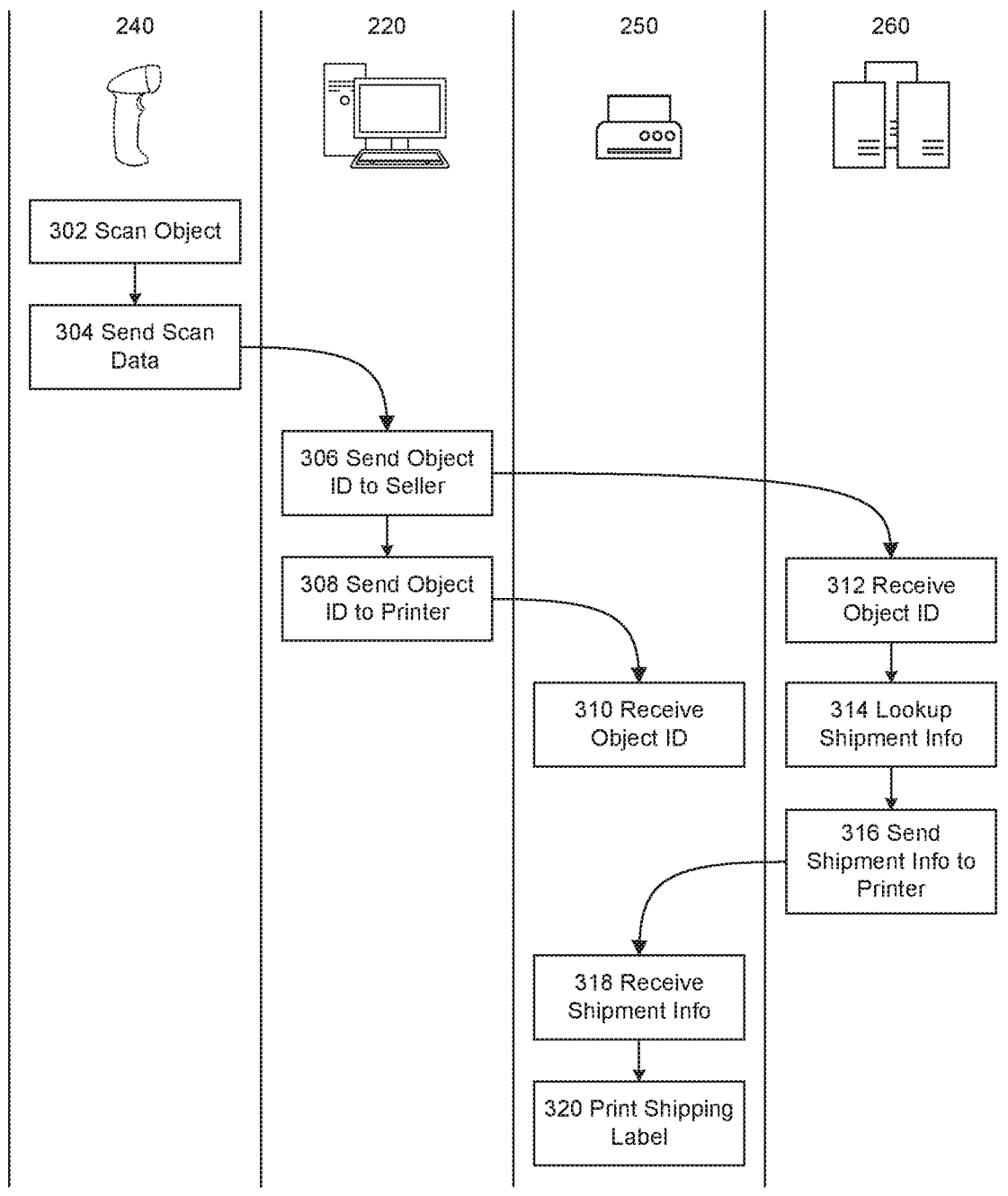
FIG. 4 depicts an embodiment of a method of printing shipping labels using the system in the shipping facility that is communicatively coupled to the remote facility depicted in FIG. 3, in accordance with the embodiments described herein.

Depicted in FIG. 4 is an embodiment of a method 300 of printing shipping labels for the object 272 that has been performed prior to the present disclosure. At block 302, the scanning device 240 scans the object 272 (e.g., by scanning a barcode on the scanning tag 274). At block 304, the scanning device 240 sends scanning data to the computing device 220. In some cases, the scanning data include an object identifier or the computing device 220 is capable of determining an object identifier from the scanning data.

At block 306, the computing device 220 sends the object identifier to the remote computing device 260 via the networks 230 and 234. At block 308, the computing device 220 sends the object identifier to the label printer 250. At block 310, the label printer 250 receives the object identifier. At block 312, the remote computing device 260 receives the object identifier. At block 314, the remote computing device 260 looks up the shipment information associated with the object identifier received from the computing device 220. At block 316, the remote computing device 260 sends shipment information to the label printer 250. At block 318, label printer 250 receives the shipment information via the networks 234 and 230. At block 320, the label printer 250 prints a shipping label using the data received from the remote computing device 260 and that corresponds with the object identifier received form the computing device 220 at block 310.

The method 300 depicted in FIG. 4 is capable of being used to print shipping labels to ship objects. However, the method 300 suffers from the amount of time taken between the time at which the object is scanned at block 302 and the time at which the shipping label is printed at block 320. After the object is scanned at block 302, the object can be inserted into a shipping container and the shipping container can be closed. In some cases, the object is inserted into the shipping container and the shipping container is closed before the shipping label is printed at block 320. This occurs particularly in the case where an automated system inserts the object into the shipping container and the shipping container is closed. In these cases, the shipping line must be idled until the shipping label is printed, thus reducing the throughput of the packaging line. Disclosed in the present disclosure are embodiments of printing shipping labels in a way that reduces the delay described above with respect to the method 300 depicted in FIG. 4.

Figure 5:
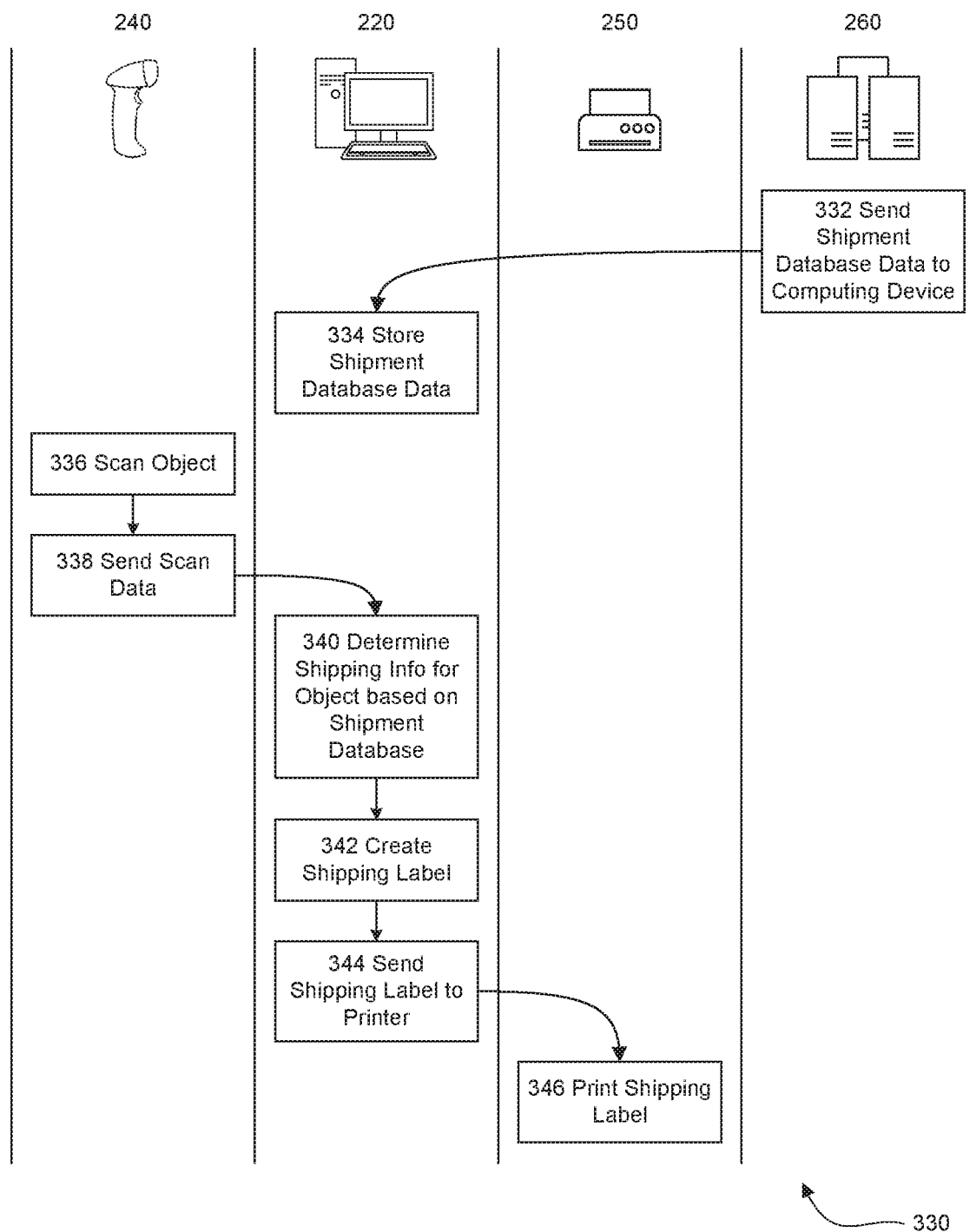
FIG. 5 depicts another embodiment of a method of printing shipping labels using the system in the shipping facility that is communicatively coupled to the remote facility depicted in FIG. 3, in accordance with the embodiments described herein.

Depicted in FIG. 5 is an example of a method 330 of facilitating printing of shipping labels. At block 332, the remote computing device 260 sends shipment database data to the computing device 220. In some embodiments, the shipment database data includes shipping information for particular objects. At block 334, the computing device 220 stores the shipment database data in a shipment database located in one or more memories in the shipping facility 210. In some embodiments, the remote computing device 260 is configured to format the shipment database data according to parameters established for the shipment database. In some embodiments, the shipment database is located in one or more memories in the computing device 220. In other embodiments, the shipment database is located in one or more memories in another computing device in the shipping facility 210. In some embodiments, the remote computing device 260 is configured to send the shipment database data for individual sale orders in response to receiving the sales orders. In some examples, the remote computing device 260 sends the shipment database data for individual sale orders either individually or in batches of multiple sale orders. In some embodiments, the shipment database is a dynamic database that can dynamically add shipment database data as it is received from the remote computing device 260 over time and the shipment database can provide shipment database data on demand from the computing device 220 and/or the label printer 250 on demand.

At block 336, the scanning device 240 scans an object. In some embodiments, scanning the object includes one or more of scanning a barcode associated with the object, scanning an RFID tag associated with the object, taking an image of the object, or any other type of scanning the object. At block 338, scan data is sent from the scanning device 240 to the computing device 220. In some embodiments, the scan data includes the data gathered by the scanning device 240, such as a character string encoded by a barcode, an identifier provided by an RFID tag, an image of the object, and the like. In one example, the scan data includes an image of the object, and the computing device 220 identifies the object based on the image in the scan data received from the scanning device 240. In other embodiments, the scan data includes information derived from the data gathered by the scanning device 240, such as an object identifier selected based on image processing of an image of the object by the scanning device 240.

At block 340, the computing device 220 determines shipping information for the object based on the shipment database. In some embodiments, the computing device 220 determines whether shipment data for the object is in the shipping database and then determines the shipping information for the object based on whether shipment data for the object is in the shipping database. In some examples, the computing device 220 determines that complete shipment data for the object (i.e., all of the information that will be printed on a shipping label) is in the shipping database. In such examples, the computing device 220 includes the complete shipment data for the object in the shipment data. In some examples, the computing device 220 determines that the shipping database contains incomplete shipment data for the object (i.e., some but not all of the information that will be printed on a shipping label) or no shipment data for the object. In such examples, the computing device 220 includes common exception shipping data in the shipment data. In some examples, common exception shipping data includes data to be used on a shipping label in place of information that would otherwise be included in the shipping label.

At block 342, the computing device 220 creates a shipping label. In some embodiments, the created shipping label is a computer file or other representation of a shipping label that is to be printed and/or applied to the shipping container. At block 344, the computing device 220 sends the created shipping label to the label printer 250. At block 346, the label printer 250 prints a shipping label for the object using the created shipping label received from the computing device 220. In some embodiments, the label printer 250 prints the shipping label on a self-adhesive sticker, directly on a shipping container, or on any other medium that is capable of being adhered to a shipping container. While the label printer 250 is in the same facility as the computing device in the embodiment shown in FIG. 5, the label printer 250 may also be located in remote facilities or provided by other entities (e.g., a shipping company).

As can be seen in FIG. 5, the process from scanning the object at block 336 to printing the shipping label at block 344 occurs independently of any communication between the system in the shipping facility 210 and the remote computing device 260. This has the benefit of having a shorter length of time between scanning the object at block 336 until printing the shipping label at block 346 in the method 330 shown in FIG. 5 compared to the length of time between scanning the object at block 302 and printing the shipping label at block 320 in method 300 shown in FIG. 4. In some embodiments, the process of the remote computing device 260 sending the shipment database data at block 332 and the computing device 220 storing the shipment database data at block 334 occurs on an ongoing basis independently of the process from scanning the object at block 336 to printing the shipping label at block 346 which also occurs on an ongoing basis. In this way, the remote computing device 260 can provide information needed for the computing device 220 and the label printer 250 to print shipping labels, while the system that includes the computing device 220 and the label printer 250 does not need to communicate with the remote computing device 260 after the object is scanned.

Figure 6:
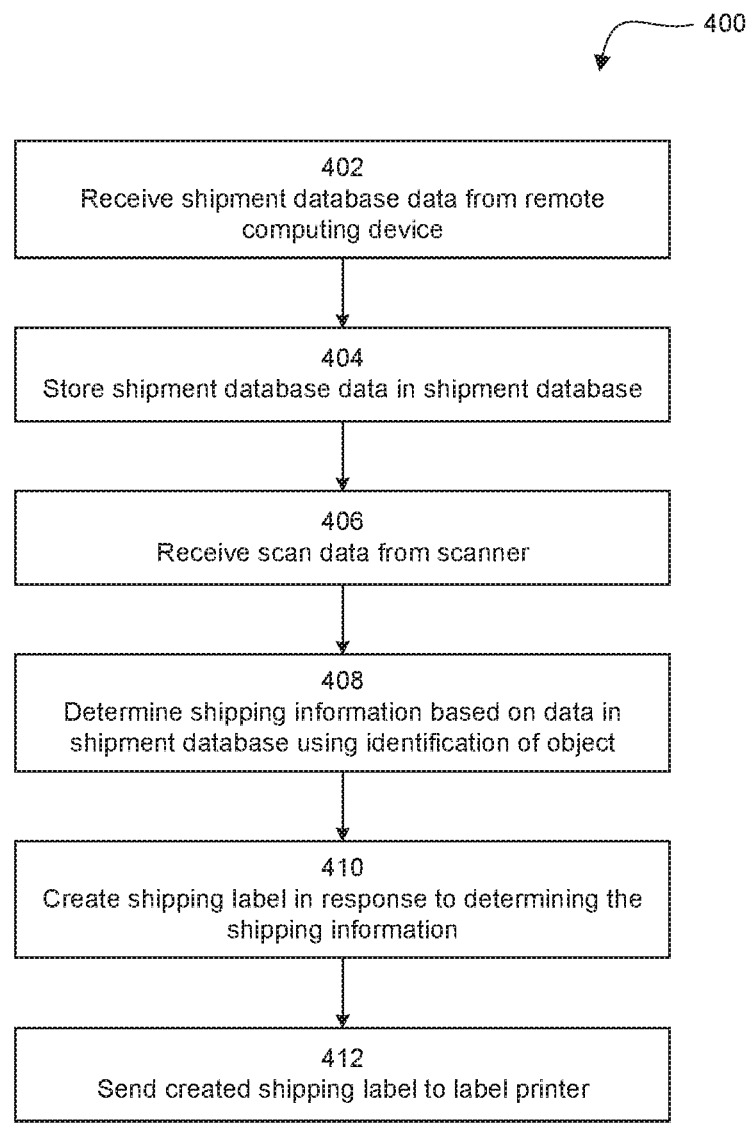
FIG. 6 depicts an embodiment of a method of facilitating printing of shipping labels that is carried out by a computing device, in accordance with the embodiments described herein.

Depicted in FIG. 6 is an embodiment of a method 400 of facilitating printing of shipping labels that is carried out by a computing device. At block 402, the computing device receives shipment database data from a remote computing device. At block 404, the computing device stores the shipment database data in a shipment database. In some embodiments, the shipping database is stored in the computing device or in another computing device located in the same facility as the computing device. Similar to other embodiments described herein, the portion of the method 400 in blocks 402 and 404 can be performed independently of the remaining portions of the method 400 on an ongoing basis.

At block 406, the computing device receives scan data from a scanning device. The scan data includes information about an object. In some embodiments, the scan data includes an identifier of the object, such as a unique object identifier, a serial number and a model number, a SKU number, and the like. In other embodiments, the scan data includes information that is usable by the computing device to identify the object, such as an image of the object that is usable by the computing device to identify the object by image processing. At block 408, the computing device determines shipping information based on data in the shipment database using the identification of the object. At block 410, the computing device creates the shipping label. In some embodiments, the created shipping label is a computer file or other representation of a shipping label that is to be printed and applied to the shipping container. At block 412, the computing device sends the determined shipping information to the label printer in response to determining the shipping information. In some embodiments, the label printer is configured to print a shipping label using the shipping information in response to receiving the shipping information from the computer device.

In some embodiments, a computer readable medium has instructions stored thereon that, in response to execution by a processing element of a computing device, cause the computing device to perform the method 400. While the method 400 and the associated computer readable medium have been described in terms of a single computing device performing the method 400, it will be that the description of the single computing device encompasses embodiments multiple computing devices communicatively coupled to each other.

Figure 7:
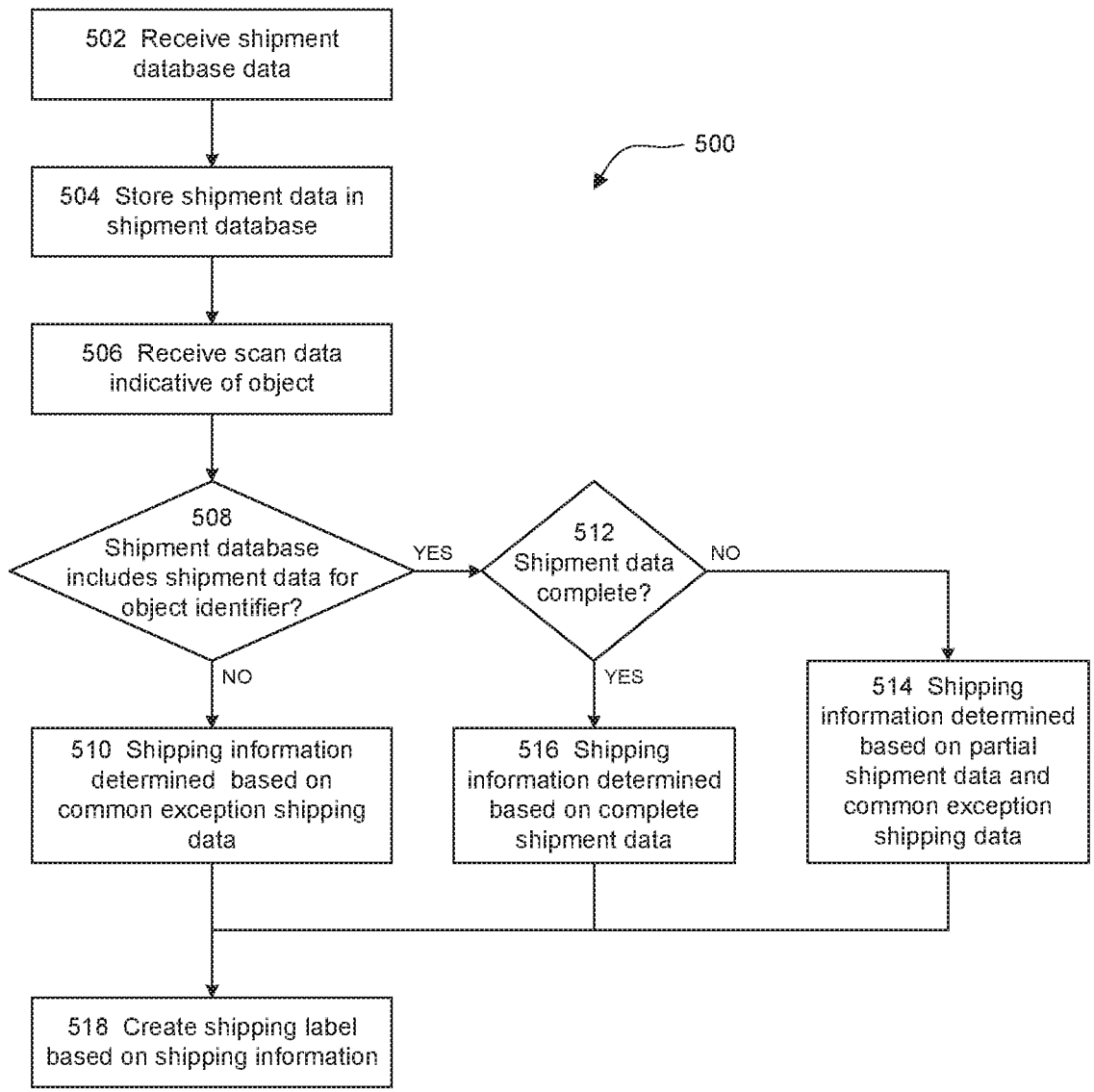
FIG. 7 depicts another embodiment of a method of facilitating printing of shipping labels that is carried out by a computing device, in accordance with the embodiments described herein.

Depicted in FIG. 7 is an embodiment of a method 500 of facilitating printing of shipping labels that is carried out by a computing device. At block 502, the computing device receives shipment database data from a remote computing device. At block 504, the computing device stores the shipment database data in a shipment database. In some embodiments, the shipping database is stored in the computing device or in another computing device located in the same facility as the computing device. Similar to other embodiments described herein, the portion of the method 500 in blocks 502 and 504 can be performed independently of the remaining portions of the method 500 on an ongoing basis.

At block 506, the computing device receives scan data from a scanning device. The scan data includes information about an object. In some embodiments, the scan data includes an identifier of the object, such as a unique object identifier, a serial number and a model number, a SKU number, and the like. In other embodiments, the scan data includes information that is usable by the computing device to identify the object, such as an image of the object that is usable by the computing device to identify the object by image processing.

At block 508, the computing device determines whether the shipment database includes shipment data for the object identifier. If, at block 508, the computing device determines that the shipment database does not include shipment data for the object identifier, then, at block 510, the computing device determines shipping information based on common exception shipping data. However, if, at block 508, the computing device determines that the shipment database does include shipment data for the object identifier, then, at block 512, the computing device determines whether the shipment data in the shipment database is complete (i.e., contains all of the information needed to print a shipping label). If, at block 512, the computing device determines that the shipment data is incomplete, then, at block 514, the computing device determines the shipping information based on a combination of the incomplete shipment data and common exception shipping data. However, if, at block 512, the computing device determines that the shipment data is complete, then, at block 516, the computing device determines the shipping information based on the complete shipment data.

Following the determination of the shipping data by the computing device either at block 510, at block 514, or at block 516, the method 500 continues to block 518. At block 518, the computing device creates a shipping label based on the determined shipping information. In some embodiments, the created shipping label is a computer file or other representation of a shipping label that is to be printed and applied to a shipping container. In some embodiments, the computing device sends the created shipping label to the label printer. In some embodiments, the label printer is configured to print a shipping label using the shipping information in response to receiving the shipping information from the computing device.

In some embodiments, a computer readable medium has instructions stored thereon that, in response to execution by a processing element of a computing device, cause the computing device to perform the method 500. While the method 500 and the associated computer readable medium have been described in terms of a single computing device performing the method 500, it will be that the description of the single computing device encompasses embodiments multiple computing devices communicatively coupled to each other.

Figure 8A:
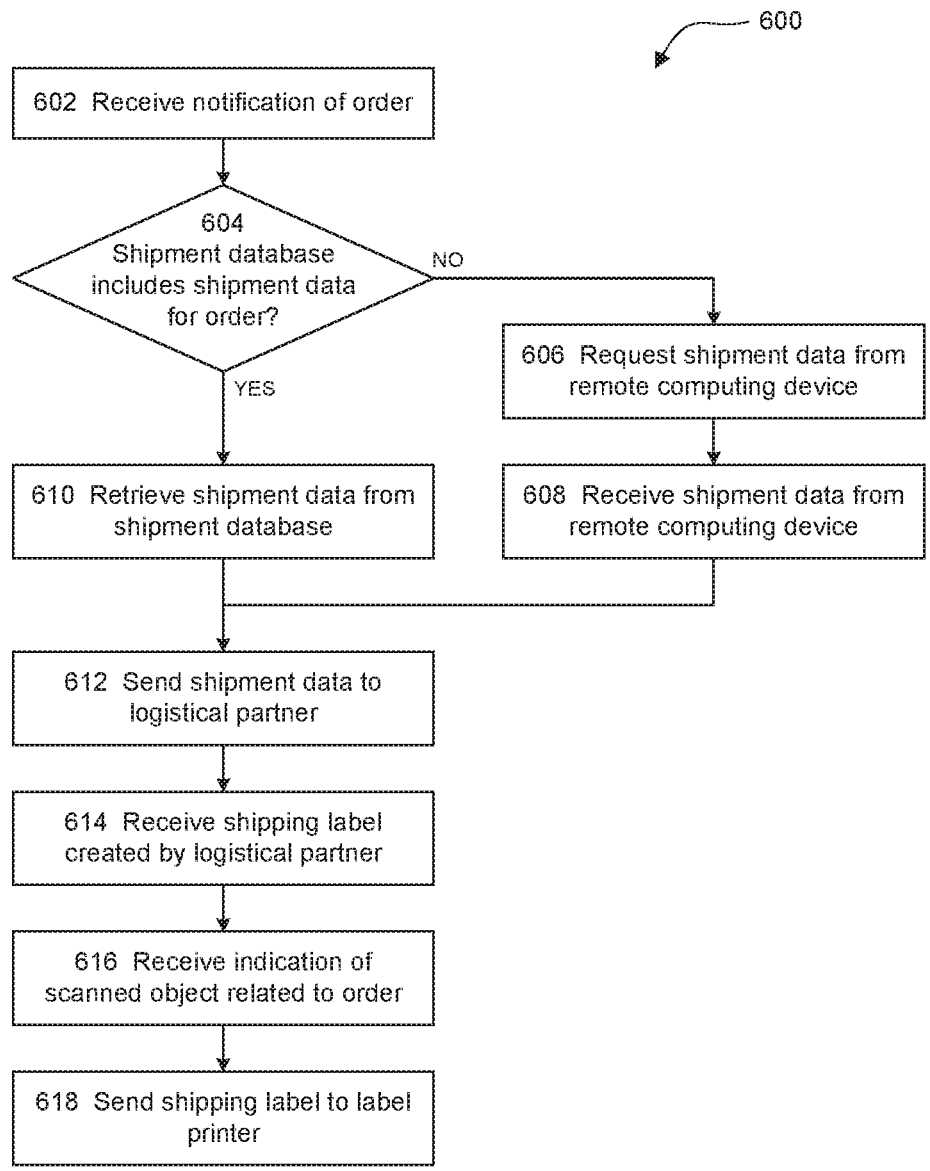
FIG. 8A depicts an embodiment of a method capable of being performed by a computing device in a shipping facility to obtain a shipping label from a logistical partner before an object is scanned for packaging.

In some embodiments, a computing device in a shipping facility is capable of obtaining a shipping label from a logistical partner before an object is scanned for packaging. Depicted in FIG. 8A is an embodiment of a method 600 capable of being performed by a computing device in a shipping facility to obtain a shipping label from a logistical partner before an object is scanned for packaging. At block 602, the computing device receives notification of an order. In some embodiments, the notification is a scan of an order form with an indication (e.g., a barcode) of the order, a message from a computing device associated with a seller of the order with an indication of the order, a user input into the computing device with an indication of the order, or any other type of notification.

At block 604, the computing device determines whether a shipment database includes shipment data for the order. In some embodiments, the shipment database is stored in a memory local to the computing device in the shipping facility (e.g., stored in memory of the computing device, stored in memory of another computing device coupled to a local network of the shipping facility, etc.). If, at block 604, the computing device determines that the shipment database does not include shipment data for the order, then the method proceed to block 606. At block 606, the computing device requests shipment data for the order from a remote computing device, such a computing device associated with a seller of the order. Then, at block 608, the computing device received the shipment data from the remote computing device. However, if, at block 604, the computing device determines that the shipment database includes the shipment data for the order, then, at block 610, the computing device retrieves the shipment data from the shipment database.

Once the computing device has obtained the shipment data—whether by receiving the shipment data from a remote computing device at block 608 or by retrieving the shipment data from the shipment database at block 610—then, at block 612, the computing device sends the shipment data to a logistical partner. In some embodiments, the logistical partner is a private shipping company (e.g., UPS, FEDEX, etc.), a governmental shipping service (e.g., USPS), or any other shipping entity. In some embodiments, the computing device is configured to communicate the shipment data to the logistical partner according to an application programming interface (API) of the logistical partner. At block 614, the computing device receives a shipping label created by the logistical partner. In some embodiments, the shipping label created by the logistical partner is a digital image or other digital file that includes the shipping label and the computing device is configured to store the shipping label. In some embodiments, the computing device is configured to store the shipping label until the computing device causes the shipping label to be printed on a physical medium (e.g., a self-adhesive label, a piece of paper, etc.).

At block 616, the computing device receives an indication of a scanned object that relates to the order. In some embodiments, the computing device receives scan data about an object from a scanning device (e.g., a barcode scanner) before the object is packaged for shipping and the computing device identifies that the object is associated with the order. At block 618, the computing device sends the shipping label to a label printer. In some embodiments, the computing device sends the shipping label to the label printer for the label printer to print the label before the object is fully packaged. In this way, the printing of the shipping label does not hinder the packaging rate of the shipping line in the shipping facility.

In some embodiments, a computer readable medium has instructions stored thereon that, in response to execution by a processing element of a computing device, cause the computing device to perform the method 600. While the method 600 and the associated computer readable medium have been described in terms of a single computing device performing the method 600, it will be that the description of the single computing device encompasses embodiments multiple computing devices communicatively coupled to each other.

Figure 8B:
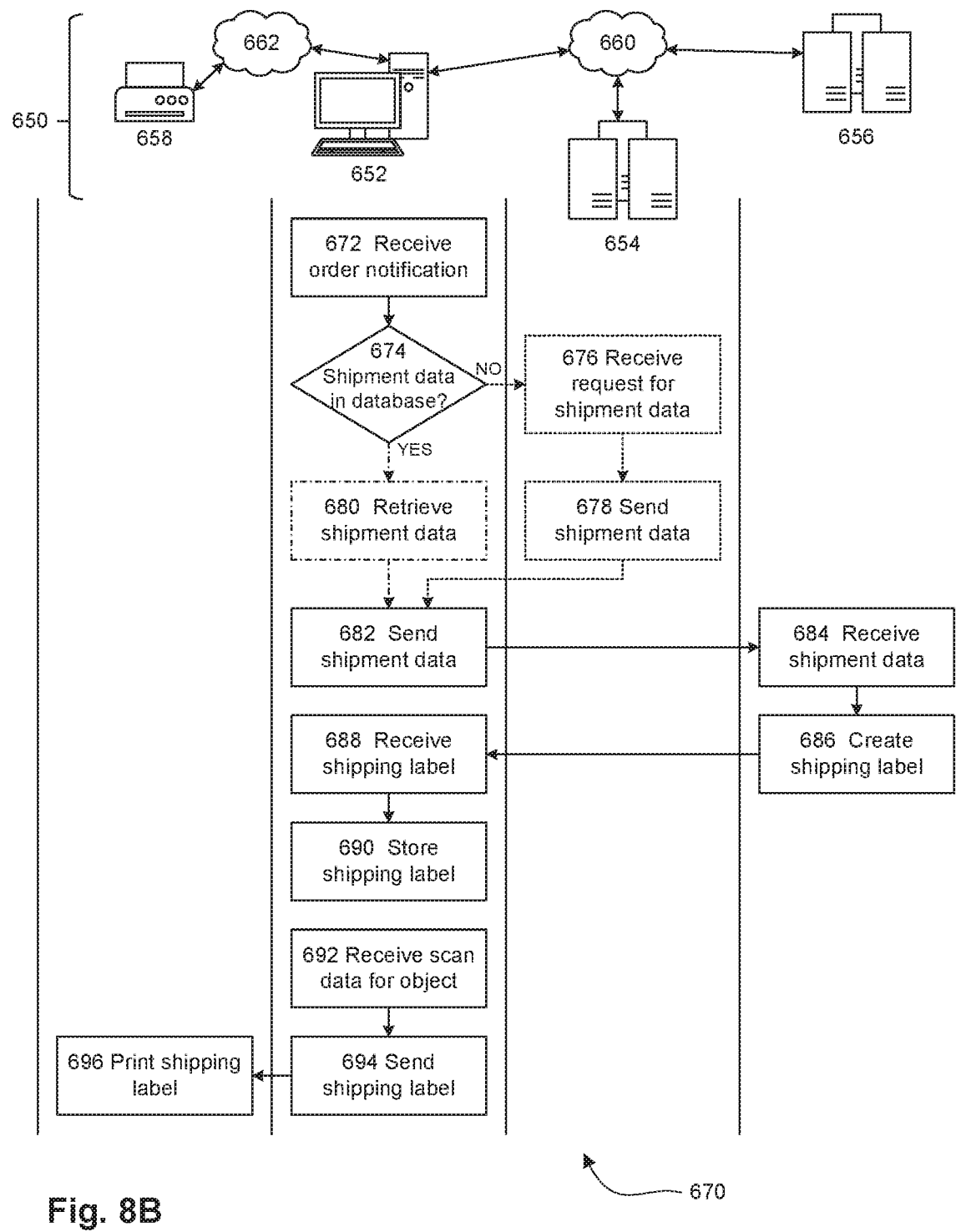
FIG. 8B depicts an example of a system and a corresponding method for obtaining a shipping label from a logistical partner before an object is scanned for packaging.

Depicted in FIG. 8B is an example of a system 650 and a corresponding method 670 for obtaining a shipping label from a logistical partner before an object is scanned for packaging. The system 650 includes a computing device 652, a first remote computing device 654, a second remote computing device 656, and a label printer 658. In some embodiments, the first remote computing device 654 is a computing device of a seller of an order and the second remote computing device 656 is associated with a logistical partner. The computing device 652, the first remote computing device 654, and the second remote computing device 656 are communicatively coupled to each other via one or more networks 660. The computing device 652 and the label printer 658 are communicatively coupled via one or more networks 662. In some embodiments, each of the one or more networks 660 and 662 include a wired network, a wireless network, or some combination thereof. In some embodiments, the one or more networks 660 include the internet and the one or more networks 662 include a local area network (LAN).

The method 670 is capable of being performed by the system 650, as depicted in FIG. 8B. At block 672, the computing device 652 receives notification of an order. In some embodiments, the notification is a scan of an order form with an indication (e.g., a barcode) of the order, a message from a computing device associated with a seller of the order with an indication of the order, a user input into the computing device with an indication of the order, or any other type of notification.

At block 674, the computing device 652 determines whether shipment data for the order is in a database (e.g., a database local to the computing device 652). If, at block 674, the computing device 652 determines that the shipment data for the order is not in the database, the method 670 proceed along the dotted lines where the computing device 652 sends a request to the first remote computing device 654 for the shipment data. At block 676, the first remote computing device 654 receives the request for the shipment data from the computing device 652. At block 678, the first remote computing device 654 sends the shipment data to the computing device 652. However, if at block 674, the computing device 652 determines that the shipment data for the order is in the database, the method 670 proceed along the dash-dot-dash lines where, at block 680, the computing device 652 retrieves the shipment data from the database.

Once the computing device 652 has obtained the shipment data—whether by receiving the shipment data from the first remote computing device 654 or by retrieving the shipment data from the shipment database—then, at block 682, the computing device 652 sends the shipment data to the second remote computing device 656 that is configured to create a shipping label based in part on the shipment data. At block 684, the second remote computing device 656 receives the shipment data. At block 686, the second remote computing device 656 creates a shipping label based in part on the shipment data. In some embodiments, the shipping label created by the logistical partner is a digital image or other digital file that includes the shipping label. The second remote computing device 656 then sends the created shipping label to the computing device 652. At box 688, the computing device 652 receives shipping label from the second remote computing device 656. At box 690, the computing device 652 stores the shipping label. In some embodiments, the computing device 652 stores the shipping label in memory located in the computing device 652 or in another computing device communicatively coupled to the computing device via a local network (e.g., a local area network).

At block 692, the computing device 652 receives scan data for an object. In various embodiments, the scan data includes one or more of a unique identifier of the object, a SKU number of the object, a model number of the object, a serial number of the object, an image of the object, or any other object identifier. In some embodiments, the computing device 652 determines that the object associated with the scan data is part of the order. At block 694, the computing device 652 sends the shipping label for the order to the label printer 658 in response to receiving the scan data at block 692. At block 696, the label printer 658 prints the shipping label. In some embodiments, the label printer 658 prints the shipping label on a self-adhesive sticker, directly on a shipping container, or on any other medium that is capable of being adhered to a shipping container. The amount of time between receiving the shipping label at box 688 and receiving the scan data at block 692 may be as short as seconds or minutes, as long as days or weeks, or any other amount of time. If the computing device 652 receives the shipping label at box 688 before the computing device 652 receives the scan data at block 692, the computing device 652 is able to send the shipping label to the label printer 658 in response to receiving the scan data associated with the object.

In some embodiments, shipping facilities may include sensors that gather data about objects. The gathered data can be used in the shipping facility, sent to a logistical partner, or sent to a seller of the object. One embodiment of a shipping facility 710 with sensors is depicted in FIG. 9.

The shipping facility 710 includes a computing device 720 and a conveyor system 770. The conveyor system is configured to convey objects $772_1$, $772_2$, $772_3$, . . . $772_N$ (collectively objects 772). In the depicted embodiment, the objects 772 are cellophane-wrapped boxes; however, the objects may be any other type of object that is capable of being shipping in a shipping container. The shipping facility 710 also includes sensors $780_1$, . . . , $780_N$ (collectively sensors 780). In the depicted embodiment, the sensor $780_1$ is a scale configured to determine weights of the objects 772 and the sensor $780_N$ is an image sensor (e.g., a camera) configured to determine physical dimensions (e.g., height, width, depth) of the objects 772. In other embodiments, the sensors 780 include any other type of sensor configured to sense a characteristic of the objects 772.

In the shipping facility 710, the sensors 780 are communicatively coupled to the computing device 720 via network 730. In some embodiments, the network 730 includes a wired network, a wireless network, or any combination of wired and/or wireless networks. In some embodiments, the network 730 includes a local area network. In some embodiments, the sensors 780 are configured to send sensed characteristics to the computing device 720 via the network 730 and the computing device 720 is configured to store the sensed characteristics.

Figure 9:
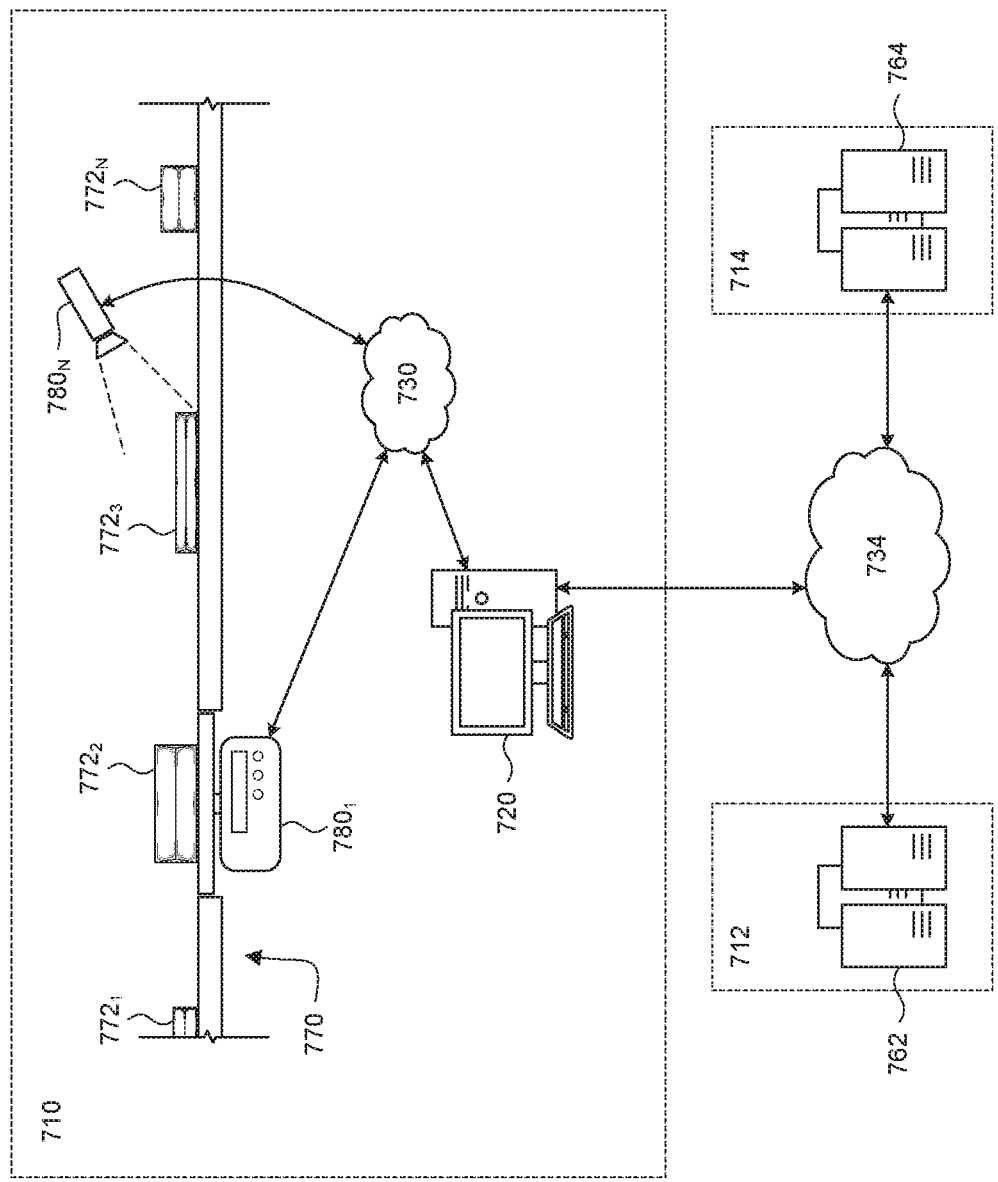
FIG. 9 depicts an embodiment of a shipping facility with sensors that gather data about objects.

Also depicted in FIG. 9 are a first remote facility 712 and a second remote facility 714. In some embodiments, the first remote facility 712 is associated with a seller of the objects 772 and a second remote facility 714 is associated with a logistical partner that will provide shipping services for the objects. The first remote facility 712 includes a first remote computing device 762, such as one or more servers. The second remote facility 714 includes a second remote computing device 764, such as one or more servers. The computing device 720 is communicatively coupled to each of the first remote computing device 762 and the second remote computing device 764 via a network 734. In some embodiments, the network 734 includes a wired network, a wireless network, or any combination of wired and/or wireless networks. In some embodiments, the network 734 includes the internet. It will be understood that each instance of the term computing device used herein (e.g., computing device 720, first remote computing device 762, second remote computing device 764) is meant to include one or more computing devices.

The sensor data stored by the computing device 720 can be used in a number of ways. In one embodiment, the computing device 720 is configured to use the sensor data in processes performed in the shipping facility, such as determining a size and/or type of shipping container to use for shipping, determining an amount of void fill material to produce for one of the objects 772, and the like. In another embodiment, the computing device 720 is configured to send sensor data to the first remote computing device 762 via the network 734, and the first remote computing device 762 is configured to use the sensor data to analyze the data about individual objects and/or shipment orders. In another embodiment, the computing device 720 is configured to send sensor data to the second remote computing device 764 via the network 734, and the second remote computing device 764 is configured to create a shipping label based in part of the sensor data (e.g., the weight of one of the objects 772). In one example, the computing device 720 is configured to communicate the sensor data to the second remote computing device 764 according to an API of a logistical partner.

In some embodiments, a computing device in a shipping facility may be capable of generating reports about activity within the shipping facility. Referring back to FIG. 3, the computing device 220, in some embodiments, is configured to generate a periodic report of the objects packaged and/or shipped for a particular seller (sometimes called a "manifest report"). In one example, the computing device 220 generates a daily report of all of the objects packaged and/or shipped by the shipping facility 210 on behalf of a seller and the computing device 220 sends the generated report to the computing device 260 each day that the report is generated.

In some embodiments, a computing device in a shipping facility is configured to be controlled remotely. Referring back to FIG. 3, the computing device 220, in some embodiments, is configured to be controlled remotely. In one example, a user in the shipping facility 210 is capable of controlling the computing device 220 using another computing device (e.g., a laptop computer, a tablet computer, etc.) that is communicatively coupled to the computing device 220 via the network 230. In another example, a user outside of the shipping facility 210 is capable of controlling the computing device 220 using another computing device (e.g., a desktop computer, a laptop computer, a tablet computer, etc.) that is communicatively coupled to the computing device 220 via the network 234 and the network 230. Any other form of remote connectivity is possible. In some embodiments, the computing device 220 is configured to challenge a user to present credentials that verify the user's identity. In some embodiments, such credential can include something known to the user (e.g., a combination of a username and password), something about the user (e.g., a biometric characteristic, such as a fingerprint or a facial image of the user), something in the user's possession (e.g., an authorized token or a code generated by a pseudo-random code generator in the user's possession), any other credential, or any combination thereof.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A method of facilitating printing of shipping labels using a system that includes a computing device and a label printer, the method comprising:
    receiving, by the computing device, shipment database data from a remote computing device via one or more networks, wherein the remote computing device is located remotely from the computing device;
    storing, by the computing device, the shipment database data in a shipment database;
    receiving, by the computing device, scan data from a scanning device, wherein the scan data is associated with an object;
    determining, by the computing device, shipping information for the object based on shipment data for the object in the shipping database;
    sending, by the computing device, shipping information to the label printer, wherein the shipping information for the object is based on shipment data for the object in the shipping database;
    printing, by the label printer, a shipping label for the object based on the shipping information in response to the label printer receiving the shipping information from the computing device; and
    packaging the object, wherein at least a part of the packaging occurs during at least a part of one or more of the determining of the shipping information, the sending of the shipping information to the label printer, and the printing of the shipping label.

2. The method of claim 1, further comprising determining whether the shipment data for the object is in the shipping database, wherein determining whether shipment data for the object is in the shipping database comprises determining, by the computing device, that complete shipment data for the object is in the shipping database, and wherein the shipping information for the object includes the complete shipment data.

3. The method of claim 1, further comprising determining whether the shipment data for the object is in the shipping database, wherein determining whether shipment data for the object is in the shipping database comprises determining, by the computing device, that the shipping database contains either incomplete shipment data for the object or no shipment data for the object, and wherein the shipping information for the object includes common exception shipping data.

4. The method of claim 1, wherein receiving the shipment database data and storing the shipment database data in the shipment database occur before receiving the scan data from the scanning device.

5. The method of claim 1, wherein the scan data includes one or more of a unique identifier of the object, a stock keeping unit (SKU) number of the object, a model number of the object, a serial number of the object, or an image of the object.

6. The method of claim 1, further comprising:
    determining, by the computing device, whether shipment data for the object is in the shipping database; and
    identifying, by the computing device, the object based on the scan data received from the scanning device before determining whether shipment data for the object is in the shipping database.

7. The method of claim 1, wherein the scanning device includes one or more of a barcode scanner, a radio frequency identification (RFID) scanner, or a camera.

8. The method of claim 1, wherein the system includes one or more memories, and wherein the shipment database is located in the one or more memories.

9. The method of claim 1, wherein the system further comprises the scanning device.

10. The method of claim 9, wherein the system is located in a shipping facility and wherein the label printer is located downstream of the scanning device along a shipping line in the shipping facility.

11. The method of claim 10, the method further comprising:
    generating, by the computing device, periodic reports indicative of objects packaged or shipped from the shipping facility on behalf of a seller; and
    sending, by the computing device, the periodic reports to a remote computing device associated with the seller.

12. A non-transitory computer readable medium having instructions stored thereon for facilitating printing of shipping labels, wherein the instructions, in response to execution by a processing element in a computing device, cause the computing device to:
    receive shipment database data from a remote computing device via one or more networks, wherein the remote computing device is located remotely from the computing device;
    store the shipment database data in a shipment database;
    receive scan data from a scanning device, wherein the scan data is associated with an object;
    determine shipping information for the object based on shipment data for the object in the shipping database; and
    create a shipping label based on the shipping information;
    wherein the computing device is configured to perform one or both of the determining of the shipping information and the creation of the shipping label at least partially during a packaging of the object.

13. The non-transitory computer readable medium of claim 12, wherein the instructions, in response to execution by the processing element, further cause the computing device to:
    send the created shipping label to a label printer, wherein the label printer is configured to print the shipping label for the object based on the created shipping label in response to the label printer receiving the created shipping label from the computing device.

14. The non-transitory computer readable medium of claim 12, wherein the instructions, in response to execution by the processing element, further cause the computing device to:
determine whether the shipment data for the object is in the shipping database, wherein the instructions that cause the computing device to determine whether shipment data for the object is in the shipping database comprise instructions that cause the computing device to determine that complete shipment data for the object is in the shipping database, and wherein the shipping information for the object includes the complete shipment data.

15. The non-transitory computer readable medium of claim 12, wherein the instructions, in response to execution by the processing element, further cause the computing device to:
determine whether the shipment data for the object is in the shipping database, wherein the instructions that cause the computing device to determine whether shipment data for the object is in the shipping database comprise instructions that cause the computing device to determine that the shipping database contains either incomplete shipment data for the object or no shipment data for the object, and wherein the shipping information for the object includes common exception shipping data.

16. The non-transitory computer readable medium of claim 12, wherein the instructions, in response to execution by the processing element, cause the computing device to receive the shipment database data and store the shipment database data in the shipment database occur before receiving the scan data from the scanning device.

17. The non-transitory computer readable medium of claim 12, wherein the instructions, in response to execution by the processing element, further cause the computing device to:
determine whether the shipment data for the object is in the shipping database; and
identify the object based on the scan data received from the scanning device before determining whether shipment data for the object is in the shipping database.

18. A system of facilitating printing of shipping labels, the system comprising:
a computing device; and
a label printer communicatively coupled to the computing device;
wherein the computing device is configured to:
receive shipment database data from a remote computing device via one or more networks, wherein the remote computing device is located remotely from the computing device,
store the shipment database data in a shipment database,
receive scan data from a scanning device, wherein the scan data is associated with an object,
determine shipping information for the object based on shipment data for the object in the shipping database, and
send shipping information to the label printer, wherein the shipping information for the object is based on shipment data for the object in the shipping database; and
wherein the label printer is configured to print a shipping label for the object based on the shipping information in response to the label printer receiving the shipping information from the computer; and
wherein the system is configured to perform one or more of the determining of the shipping information by the computing device, the sending of the shipping information to the label printer, and the printing of the shipping label by the label printer at least partially during a packaging of the object.

19. The system of claim 18, wherein the computing device is configured to determine whether shipment data for the object is in the shipping database by determining that complete shipment data for the object is in the shipping database, and wherein the shipping information for the object includes the complete shipment data.

20. The system of claim 18, wherein the computing device is configured to determine whether shipment data for the object is in the shipping database by determining that the shipping database contains either incomplete shipment data for the object or no shipment data for the object, and wherein the shipping information for the object includes common exception shipping data.

21. The system of claim 18, wherein the computing device is configured to receive the shipment database data and store the shipment database data in the shipment database before receiving the scan data from the scanning device.

22. The system of claim 18, wherein the computing device is further configured to determine whether the shipment data for the object is in the shipping database and to identify the object based on the scan data received from the scanning device before determining whether shipment data for the object is in the shipping database.

23. The system of claim 18, wherein the system further comprises the scanning device.

24. The system of claim 23, wherein the system is located in a shipping facility and wherein the label printer is located downstream of the scanning device along a shipping line in the shipping facility.

25. The system of claim 24, wherein the shipping facility includes one or more sensors configured to determine a characteristic of an object.

26. The system of claim 25, wherein the computing device is configured to receive sensor data about one or more objects from the one or more sensors and to perform one or more of:
store the sensor data in a memory located in the shipping facility;
send the sensor data to a remote computing device associated with a seller of the one or more objects; or
send the sensor data to a remote computing device associated with a logistical partner.

* * * * *